US011869349B2

(12) United States Patent
Kai et al.

(10) Patent No.: US 11,869,349 B2
(45) Date of Patent: Jan. 9, 2024

(54) TRAFFIC CONTROL DEVICE AND TRAFFIC LIGHT

(71) Applicant: KOITO ELECTRIC INDUSTRIES, LTD., Shizuoka (JP)

(72) Inventors: Hiromitsu Kai, Shizuoka (JP); Kenji Sumi, Shizuoka (JP); Yuichi Hida, Shizuoka (JP); Shinji Tatemoto, Shizuoka (JP)

(73) Assignee: KOITO ELECTRIC INDUSTRIES, LTD., Shizuoka (JP)

( * ) Notice: Subject to any disclaimer, the term of this patent is extended or adjusted under 35 U.S.C. 154(b) by 43 days.

(21) Appl. No.: 17/595,969

(22) PCT Filed: Jul. 21, 2020

(86) PCT No.: PCT/JP2020/028262
§ 371 (c)(1),
(2) Date: Nov. 30, 2021

(87) PCT Pub. No.: WO2021/020232
PCT Pub. Date: Feb. 4, 2021

(65) Prior Publication Data

US 2022/0319315 A1 Oct. 6, 2022

(30) Foreign Application Priority Data

Jul. 31, 2019 (JP) ................................ 2019-141533

(51) Int. Cl.
*G08G 1/087* (2006.01)
*G08G 1/01* (2006.01)
(Continued)

(52) U.S. Cl.
CPC ........... *G08G 1/087* (2013.01); *G08G 1/0133* (2013.01); *G08G 1/0145* (2013.01); *G08G 1/081* (2013.01); *G08G 1/127* (2013.01)

(58) Field of Classification Search
CPC .... G08G 1/087; G08G 1/0133; G08G 1/0145; G08G 1/081; G08G 1/127; G08G 1/07
See application file for complete search history.

(56) References Cited

U.S. PATENT DOCUMENTS 5,602,739 A * 2/1997 Haagenstad et al. .. G08G 1/127 701/117
10,720,053 B1 * 7/2020 Clanney et al. ....... H05B 47/16
(Continued)

FOREIGN PATENT DOCUMENTS

BE 854 994 A1 11/1977
CN 102568221 A 7/2012
(Continued)

OTHER PUBLICATIONS

International Search Report dated Oct. 13, 2020 in International Application No. PCT/JP2020/028262.
(Continued)

*Primary Examiner* — Andrew W Bee
(74) *Attorney, Agent, or Firm* — Saliwanchik, Lloyd & Eisenschenk

(57) ABSTRACT

[Solving Means] A traffic control device according to an embodiment of the present invention is a traffic control device that controls a traffic light installed on a route of a vehicle running on the basis of an operation diagram, including: an acquisition unit; a determination unit; and a signal generation unit. The acquisition unit acquires, from the vehicle, vehicle information including information regarding the operation diagram and a current position of the vehicle. The determination unit calculates, on the basis of the vehicle information, an estimated time of arrival at the traffic light, and determines whether or not the estimated time is on a scheduled time. The signal generation unit generates, where it is determined that the estimated time is delayed from the scheduled time, a control signal for causing
(Continued)

the traffic light to execute signal control for preferentially causing the vehicle to pass therethrough.

4 Claims, 4 Drawing Sheets

(51) Int. Cl.

| | |
|---|---|
| ***G08G 1/081*** | (2006.01) |
| ***G08G 1/127*** | (2006.01) |

(56) References Cited

U.S. PATENT DOCUMENTS

| | | | | |
|---|---|---|---|---|
| 2007/0008173 | A1 | 1/2007 | Schwartz | |
| 2012/0326891 | A1* | 12/2012 | Cross ................... | G08G 1/0145 |
| 2018/0063261 | A1 | 3/2018 | Moghe et al. | |
| 2019/0180615 | A1 | 6/2019 | Heise | |

FOREIGN PATENT DOCUMENTS

| | | | |
|---|---|---|---|
| CN | 202584431 | U | 12/2012 |
| CN | 108470455 | A | 8/2018 |
| JP | 50-64689 | A | 5/1975 |
| JP | 60-65197 | A | 6/1975 |
| JP | 2005-234656 | A | 9/2005 |
| JP | 2009-176235 | A | 8/2009 |
| JP | 2010-250646 | A | 11/2010 |
| JP | 2010250646 | * | 11/2010 |
| JP | 2011-141606 | A | 7/2011 |
| JP | 2012-103843 | A | 5/2012 |

OTHER PUBLICATIONS

Office Action dated Jul. 1, 2022 in Indian Application No. 202117058969.

Office Action dated Feb. 28, 2023 in Chinese Application No. 202080045762.7.

Supplementary European Search Report dated Jul. 5, 2023 in European Application No. 20847607.7.

Office Action dated Oct. 19, 2023 in European Application No. 20 847 607.7.

* cited by examiner

TRAFFIC CONTROL DEVICE AND TRAFFIC LIGHT

CROSS-REFERENCE TO RELATED APPLICATIONS

This application is the U.S. national stage application of International Patent Application No. PCT/JP2020/028262, filed Jul. 21, 2020, which claims the benefit under 35 U.S.C. § 119 of Japanese Application No. 2019-141533, filed Jul. 31, 2019, the disclosures of each of which are incorporated herein by reference in their entirety.

TECHNICAL FIELD

The present invention relates to a traffic control device and a traffic light for causing a public vehicle to run on time.

BACKGROUND ART

In recent years, a public transportation priority system (PTPS) for the on-time operation of a public vehicle such as a fixed-route bus has been developed. As a technology of this kind, for example, Patent Literature 1 discloses a signal control system for extending or shortening the signaling time in accordance with the proximity of a public vehicle to an intersection.

In this system, vehicle information is acquired by an optical beacon from a bus at a predetermined position upstream of the intersection, the time at which the vehicle information was acquired (passage time) is compared with the scheduled time based on an operation diagram of the bus stored in a central unit to calculate a delay time period, and when the delay time period is equal to or larger than a predetermined threshold value, the public vehicle priority signal control for extending the green light of a signal lamp of the intersection or shortening the red light is executed.

CITATION LIST

Patent Literature

Patent Literature 1: Japanese Patent Application Laid-open No. 2010-250646

DISCLOSURE OF INVENTION

Technical Problem

However, in the signal control system described in Patent Literature 1, since an operation diagram of a target public vehicle needs to be registered in advance in the central unit, the procedure thereof is complicated. In addition, it is difficult to quickly apply the priority control to a vehicle such as a temporary bus.

In view of the circumstances as described above, it is an object of the present invention to provide a traffic control device and a traffic light that are capable of implementing operation support for a specific vehicle without requiring pre-registration.

Solution to Problem

In order to achieve the above-mentioned object, a traffic control device according to an embodiment of the present invention is a traffic control device that controls a traffic light installed on a route of a vehicle running on the basis of an operation diagram, including: an acquisition unit; a determination unit; and a signal generation unit.

The acquisition unit acquires, from the vehicle, vehicle information including information regarding the operation diagram and a current position of the vehicle.

The determination unit calculates, on the basis of the vehicle information, an estimated time of arrival at the traffic light, and determines whether or not the estimated time is on a scheduled time.

The signal generation unit generates, where it is determined that the estimated time is delayed from the scheduled time, a control signal for causing the traffic light to execute signal control for causing the vehicle to preferentially pass therethrough.

In accordance with the traffic control device, since vehicle information including an operation diagram is acquired from a vehicle and delay from a scheduled time is determined, the operation support can be performed without requiring pre-registration of an operation diagram.

The signal generation unit may be configured to generate, where the delay is determined, a control signal for controlling the traffic light such that the traffic light turns a light color in which the vehicle is capable of passing through the traffic light at an estimated time at which the vehicle arrives at the traffic light.

The acquisition unit may be configured to further obtain congestion information of a route in a vicinity of a bus stop, and the determination unit may be configured to calculate, on the basis of the vehicle information and the congestion information, an estimated time of arrival at the traffic light.

A traffic light according to an embodiment of the present invention is a traffic light installed on a route of a vehicle running on the basis of an operation diagram, including: a signal lamp; and a signal control device.

The signal control device includes an acquisition unit, a determination unit, and a signal generation unit.

The acquisition unit acquires, from the vehicle, vehicle information including information regarding the operation diagram and a current position of the vehicle.

The determination unit calculates, on the basis of the vehicle information, an estimated time at which the vehicle arrives at the traffic light, and determines whether or not the estimated time is on a scheduled time.

The signal generation unit generates, where it is determined that the estimated time is delayed from the scheduled time, a control signal for controlling the signal lamp such that the signal lamp turns a light color in which the vehicle is capable of passing through the traffic light.

Advantageous Effects of Invention

In accordance with the present invention, it is possible to implement operation support for a specific vehicle without requiring pre-registration.

MODE(S) FOR CARRYING OUT THE INVENTION

Hereinafter, embodiments of the present invention will be described with reference to the drawings.

First Embodiment

Figure 1:
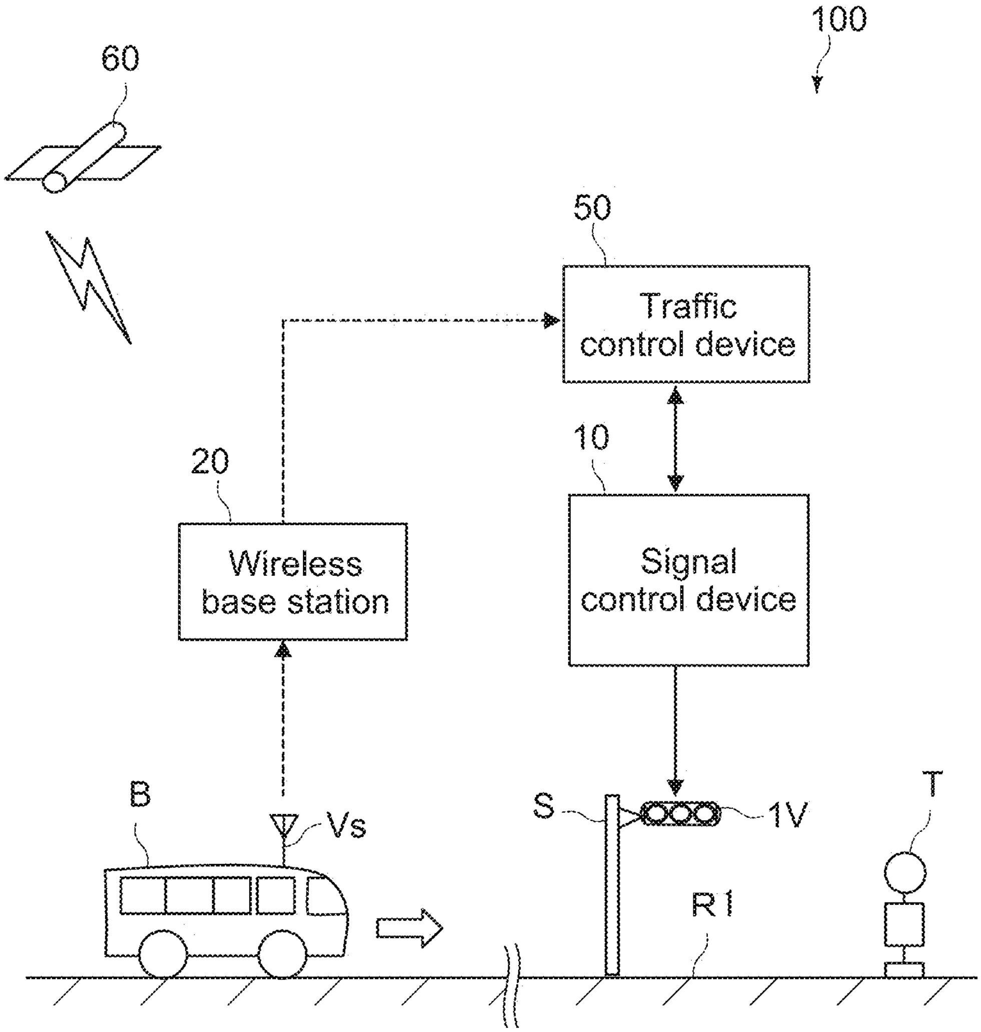
FIG. 1 is a schematic configuration diagram showing a traffic control system according to a first embodiment of the present invention.
Figure 2:
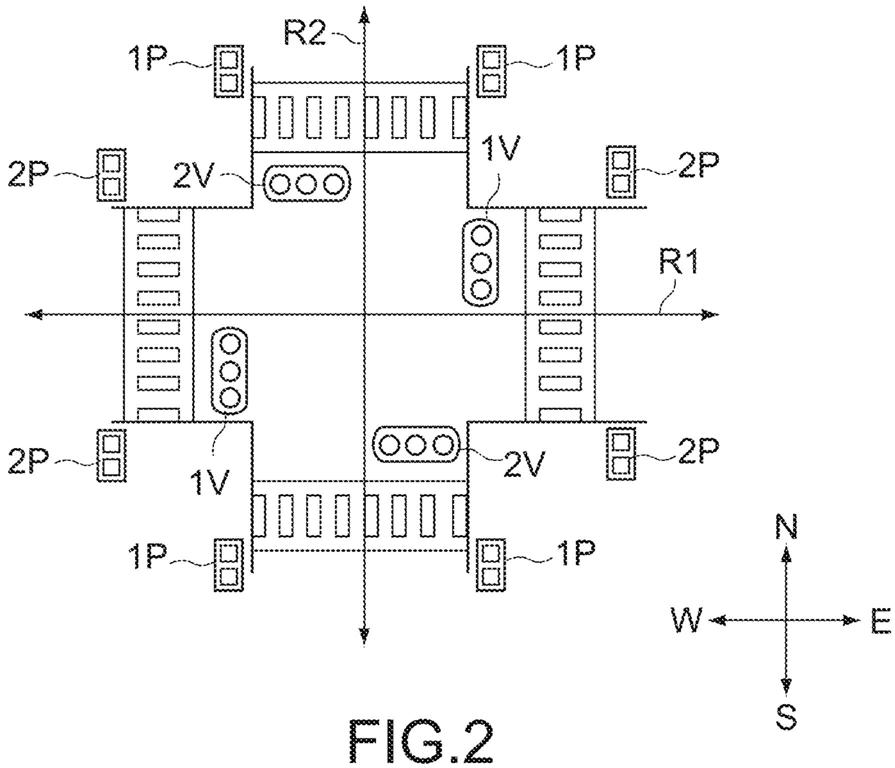
FIG. 2 is a schematic diagram showing a road intersection to which the traffic control system is applied.

FIG. 1 is a schematic configuration diagram showing a traffic control system 100 according to a first embodiment of the present invention, and FIG. 2 is a schematic diagram showing a road intersection to which the traffic control system 100 is applied.

The traffic control system 100 according to this embodiment includes a signal control device 10, a wireless base station 20, and a traffic control device 50.

As shown in FIG. 2, the signal control device 10 controls a plurality of signal lamps including vehicle signal lamps 1V and 2V installed on roads R1 and R2 that respectively extend in the east-west direction (in the right and left direction in the figure) and the north-source direction (in the up and down direction in the figure) and pedestrian signal lamps 1P and 2P installed on crosswalks of the respective roads.

The signal control device 10 controls the light emission (green, yellow, and red) of the respective signal lamps in the lighting time (phase seconds) and period on the basis of the preset signal information using a commercial power source as a power source. The signal control device 10 is typically installed in a control box (not shown) attached to a strut of a traffic light S, and is electrically connected to the respective lamps 1V, 2V, 1P, and 2P by wires.

The signal control device 10 is capable of communicating with the traffic control device 50, and is configured to execute preferential signal control on a bus B running on the road R1 on the basis of a command from the traffic control device 50.

Here, the bus B is typically a public vehicle such as a bus including the road R1 as an operation route, and includes a regular bus and a temporary bus running on the basis of an operation diagram. Further, the bus B is not limited to these fixed-route buses, and may be a shuttle bus that reciprocates between various private or public facilities and terminals such as stations on the basis of a predetermined operation diagram. Further, the bus B may also be a self-driving vehicle.

The bus B is equipped with a GNSS (Global Navigation Satellite System) terminal capable of acquiring GNSS information including information regarding the current position of the bus B, the current time, the running velocity, and the like from a GNSS satellite 60. Further, the bus B is equipped with an in-vehicle device Vs capable of transmitting, the wireless base station 20, vehicle information including the GNSS information described above and operation information such as an operation diagram (timetable) of the bus B, a bus name, and an in-operation/out-of-service flag. As the operation information described above, for example, data conforming to a dynamic bus information format (GTSF (General Transit Feed Specification) real time) or a static bus information format (GTSF-JP) can be used.

The wireless base station 20 receives vehicle information transmitted from the bus B, and transmits the received vehicle information to the traffic control device 50. The communication line is not particularly limited. Typically, an LTE (Long Term Evolution) line is used, but it goes without saying that the communication line is not limited thereto.

Figure 3:
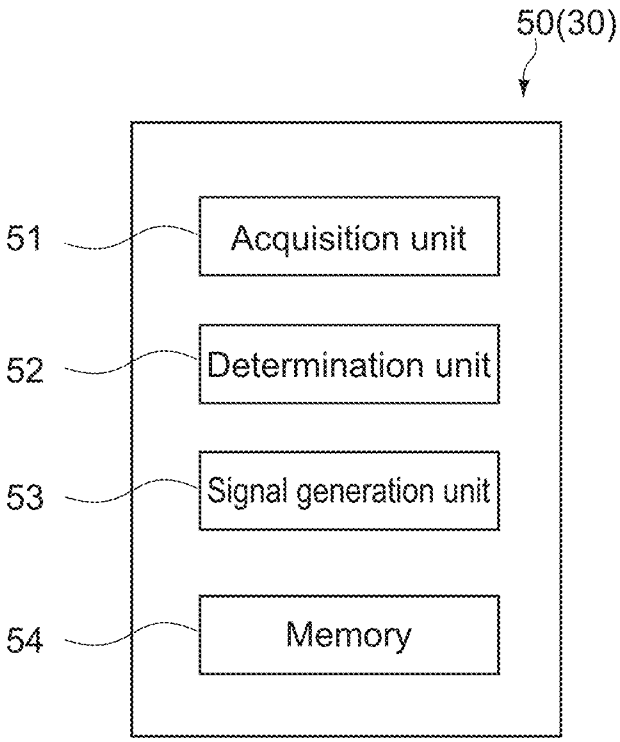
FIG. 3 is a block diagram showing a configuration of a traffic control device in the traffic control system.

The traffic control device 50 functions as a central unit, and typically includes a computer including a CPU (Central Processing Unit) and the like. FIG. 3 is a block diagram showing a configuration of the traffic control device 50. As shown in FIG. 3, the traffic control device 50 includes an acquisition unit 51, a determination unit 52, a signal generation unit 53, a memory 54, and the like.

The acquisition unit 51 is configured to be capable of acquiring vehicle information including the GNSS information and operation information described above from the bus B via the wireless base station 20. The period of transmission of the vehicle information from the bus B is not particularly limited, and may be a few seconds or a few minutes.

The acquisition unit 51 is configured to further obtain congestion information of the road R1. The congestion information can be obtained from, for example, a detection signal of a sensor installed on the road side of the road R1 or probe information transmitted from a vehicle capable of using a driving support system (ITS: Intelligent Transport System), and the congestion length is calculated on the basis of the occupancy of a vehicle at a predetermined position of the road R1, or the like.

The determination unit 52 is configured to calculate, on the basis of the vehicle information, an estimated time of arrival at the traffic light S, and determine whether or not the estimated time is delayed from a scheduled time. The scheduled time refers to the time at which the vehicle is capable of arriving at a bus stop (bus station) T installed on the downstream side of the traffic light S in accordance with a timetable (or departing from the bus stop T in accordance with the timetable). The schedule time is not necessarily set in minutes, but may be set in several minutes.

Note that the estimated time at which the bus B arrives at the bus stop T can be calculated on the basis of the distance from the traffic light S to the bus stop T. The bus stop T is not necessarily installed on the downstream side of the traffic light S, and may be installed on the upstream side of the traffic light S.

The signal generation unit 53 generates, where it is determined that the estimated time at which the bus B arrives at the traffic light S is delayed from a scheduled time on the basis of the operation diagram transmitted from the bus B, a control signal for causing the traffic light S to execute signal control for causing the bus B to preferentially pass therethrough. The determination reference of the delay may be the scheduled time itself, or may be an arbitrary time after a predetermined time has elapsed from the scheduled time. Typical examples of the signal control for causing the bus B to preferentially pass therethrough include increasing the time for a signal lamp light being green and decreasing the time for a signal lamp light being red.

The memory 54 includes a storage medium such as a non-volatile semiconductor storage device and a hard disk. The memory 54 stores various parameters including software (programs) for causing the acquisition unit 51, the determination unit 52, and the signal generation unit 53 to operate as functional blocks, the positional information of the traffic light S and the bus stop T, and the phase step (cycle) table of the traffic light S.

Figure 4:
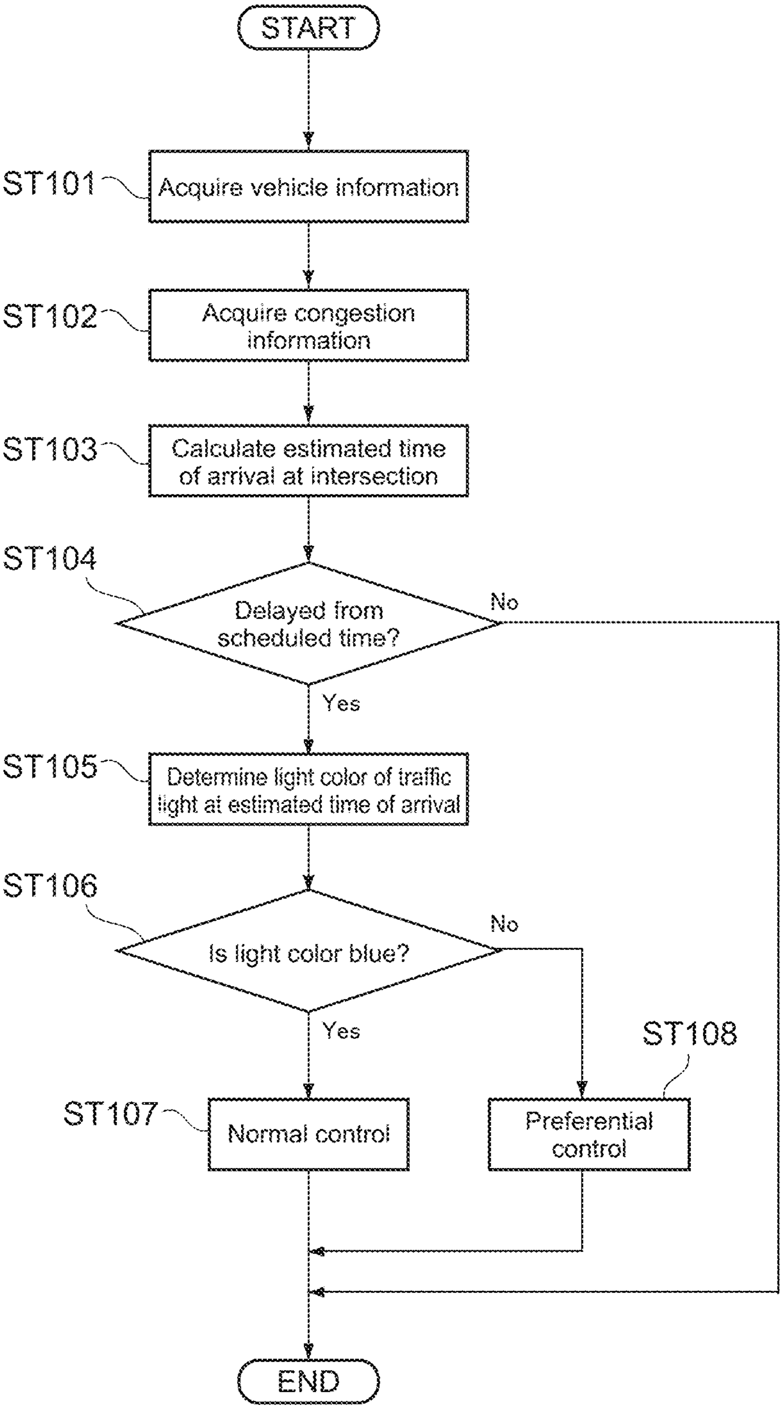
FIG. 4 is a flowchart showing an example of a processing procedure executed in the traffic control device.

Next, the traffic control device 50 will be described in detail together with a typical operation of the traffic control system 100. FIG. 4 is a flowchart showing an example of a processing procedure executed in the traffic control device 50.

The acquisition unit 51 acquires, from the bus B running on the road R1 via the wireless base station 20, vehicle information (a timetable, a bus name, a current position, the current time, a running velocity, and the like) regarding the bus B in a constant period (Step 101). The acquisition unit 51 further acquires congestion information (e.g., congestion length) regarding the road R1 on which the bus B runs (Step 102).

The determination unit 52 calculates, on the basis of the vehicle information regarding the bus B and congestion information regarding the road R1 acquired in the acquisition unit 51, an estimated time at which the bus B arrives at an intersection (the traffic light S) installed in front of the bus stop T (Step 103). By referring to the congestion information for calculating the estimated time of arrival, it is possible to improve the accuracy for calculating the estimated time at which the bus B arrives at the traffic light S.

The determination unit 52 may further calculate, on the basis of the vehicle information and the congestion information, an estimated time at which the bus B arrives at the bus stop T. In this case, the time of arrival at the bus stop T is calculated by taking into account the step cycle of the traffic light S, the distance of the line of vehicles stopping when the light color of the traffic light S is red, and the like.

Then, the determination unit 52 determines whether or not the estimated time at which the bus B arrives at the intersection (the traffic light S) is delayed from the scheduled time (Step 104), ends the processing as it is when delay has not occurred, and repeats the above-mentioned processing (Steps 101 to 104) again.

Meanwhile, the determination unit 52 determines, in the case where it is determined that the estimated time at which the bus B arrives at the intersection (the traffic light S) is delayed from the scheduled time, a light color of the traffic light S at the estimated time (Step 105). The light color of the traffic light S is determined on the basis of the step (cycle) table of the traffic light S. Then, in the case where the light color is green ("Yes" in Step 106), since the bus B is capable of passing through the traffic light S without stopping, the signal control device 10 of the traffic light 1 is caused to execute normal signal control (Step 107).

Meanwhile, in the case where the light color of the traffic light S is other than green, i.e., yellow or red, at the estimated time at which the bus B arrives at the traffic light S ("No" in Step 106), i.e., the signal generation unit 53 generates a control signal for causing the traffic light S to execute preferential control for causing the bus B to preferentially pass therethrough, and transmits this to the signal control device 10 (Step 108).

As the preferential control for causing the bus B to pass therethrough, typically, the signal generation unit 53 generates a control signal for controlling the traffic light S such that the traffic light S turns a light color (i.e., green) in which the bus B is capable of passing through the traffic light S in the cycle at the estimated time at which the bus B arrives at the traffic light S. Specifically, a control signal for extending the green lighting of the traffic light S until the estimated time in the case where the light color at the estimated time described above is yellow or shortening the red lighting in the case where the light color at the estimated time described above is red is generated.

As described above, by executing the preferential control for the bus B on the traffic light S, the time required for the bus B to pass through the traffic light S is shortened, and the delay of arrival at the bus stop T can be suppressed. As a result, it is possible to facilitate the operation according to the scheduled time of the bus B. In addition, since this preferential control is realized by partially changing the step of the cycle performed the estimated time at which the bus B arrives at the traffic light S, it is possible to suppress the occurrence of traffic congestion on the road R2 crossing the road R1.

In particular, in accordance with this embodiment, since an operation diagram of the bus B can be acquired from the vehicle information transmitted from the bus B, the operation diagram does not need to be pre-registered in the traffic control device 50, and therefore the above-mentioned preferential signal control can be applied also to a bus that is operated irregularly such as a temporary bus.

Further, since the estimated time at which the bus B arrives at the traffic light S is calculated on the basis of the vehicle information received periodically, the estimation accuracy of the arrival time is improved, and the road situation that changes every moment can be sufficiently dealt with. Further, in accordance with this embodiment, since the estimated time at which the bus B arrives at the traffic light S is calculated by referring not only to the vehicle information of the bus B but also to the congestion information of the road R1, it is possible to further improve the accuracy of the estimated time.

Note that the traffic control device 50 may case a plurality of adjacent traffic lights to share signal information of the respective traffic lights and the vehicle information of the bus B. In this case, it is possible to realize the operation according to the scheduled time of the bus B by the cooperation of the plurality of traffic lights. The sharing of information may be performed via the traffic control device 50, or may be performed by mutual communication between traffic lights.

Second Embodiment

Figure 5:
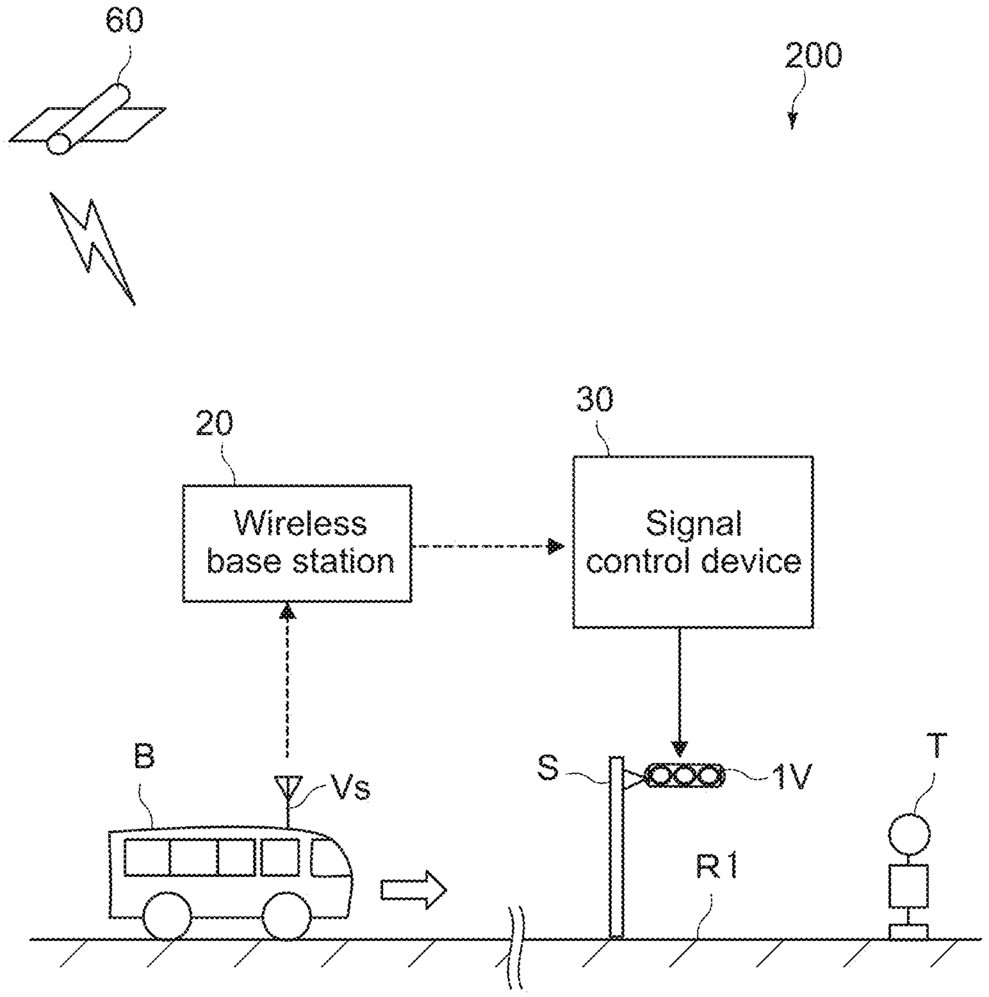
FIG. 5 is a schematic configuration diagram showing a traffic control system according to a second embodiment of the present invention.

FIG. 5 is a schematic configuration diagram showing a traffic control system 200 according to a second embodiment of the present invention. Hereinafter, a configuration different from that of the first embodiment will be mainly described, and the same components as those of the first embodiment will be denoted by the same reference symbols, and description thereof will be omitted or simplified.

The traffic control system 200 according to this embodiment is different from that in the first embodiment in that it includes a signal control device 30 that controls a stand-alone traffic light S equipped with no traffic control device (central unit). As shown in FIG. 3, the signal control device 30 includes the acquisition unit 51, the determination unit 52, the signal generation unit 53, and the memory 54. That is, the signal control device 30 has a function similar to that of the traffic control device 50 described in the above-mentioned first embodiment.

In this embodiment, the signal control device 30 is configured as part of the traffic light S installed on the road R1, and controls the signal lamp 1V installed on the road R1. The signal control device 30 includes, as the acquisition unit 51, a communication module capable of receiving, from the bus B, vehicle information including GNSS information and identification information of the bus B. The signal control device 30 is configured to be capable of acquiring the vehicle information of the bus B by the communication module described above via the wireless base station 20 (or directly without through the wireless base station 20), and executing preferential control similar to that in the above-mentioned first embodiment on the basis of the vehicle information (see FIG. 4).

In accordance with this embodiment, it is possible to execute the preferential control for the bus B even in the traffic control system 200 including no central unit. Therefore, also in this embodiment, it is possible to achieve the operation and effect similar to those in the above-mentioned first embodiment.

In this embodiment, the above-mentioned preferential control may be executed on all traffic lights capable of receiving vehicle information. In this case, on the basis of the vehicle information from the bus B, a bus stop at which the bus B stops next is selected and the control of the light color of each traffic light may be executed such that a plurality of traffic lights through which the bus B passes before arriving at the bus stop cooperate to cause the bus to arrive at the bus stop at the scheduled time.

Although the embodiments of the present invention have been described above, it goes without saying that the present invention is not limited to the above-mentioned embodiments and various modifications may be made.

For example, the light color control of a traffic light installed at an intersection has been described in the embodiments described above, but the present invention is also applicable to a traffic light installed at a place other than the intersection.

REFERENCE SIGNS LIST

1V, 2V vehicle signal lamp (signal lamp)
10, 30 signal control device
20 wireless base station
50 traffic control device
51 acquisition unit
52 determination unit
53 signal generation unit
100, 200 traffic control system
B bus
S traffic light
T bus stop

The invention claimed is:

1. A traffic control device that controls a traffic light installed on a route of a vehicle running on a basis of an operation diagram, comprising:

an acquisition unit that acquires, from a wireless base station, vehicle information including the operation diagram and a current position of the vehicle, the vehicle information being transmitted from the vehicle, the wireless base station receiving the vehicle information on an upstream side of a traveling direction of the vehicle relative to the traffic light;

a determination unit that calculates, on a basis of the vehicle information acquired by the acquisition unit, an estimated time of arrival at the traffic light, and determines whether or not the estimated time is delayed from a scheduled time; and a signal generation unit that generates, where it is determined that the estimated time is delayed from the scheduled time, a control signal for causing the traffic light to execute signal control for preferentially causing the vehicle to pass therethrough.

2. The traffic control device according to claim 1, wherein the signal generation unit generates, where the delay is determined, a control signal for controlling the traffic light such that the traffic light turns a light color in which the vehicle is capable of passing through the traffic light at an estimated time at which the vehicle arrives at the traffic light.

3. The traffic control device according to claim 1, wherein the acquisition unit further obtains congestion information of the route, and the determination unit calculates, on a basis of the vehicle information and the congestion information, an estimated time of arrival at the traffic light.

4. A traffic light installed on a route of a vehicle running on a basis of an operation diagram, comprising:

a signal lamp; and a signal control device that includes an acquisition unit that acquires, from a wireless base station, vehicle information including the operation diagram and a current position of the vehicle, the vehicle information being transmitted from the vehicle, the wireless base station receiving the vehicle information on an upstream side of a traveling direction of the vehicle relative to the traffic light, a determination unit that calculates, on a basis of the vehicle information acquired by the acquisition unit, an estimated time at which the vehicle arrives at the traffic light, and determines whether or not the estimated time is delayed from a scheduled time, and a signal generation unit generates, where it is determined that the estimated time is delayed from the scheduled time, a control signal for controlling the signal lamp such that the signal lamp turns a light color in which the vehicle is capable of passing through the traffic light.

* * * * *